Patented June 10, 1947

2,421,836

UNITED STATES PATENT OFFICE 2,421,836

KETO-SULFONES

Moses Wolf Goldberg, Montclair, N. J., assignor to Hoffmann-La Roche, Inc., Roche Park, Nutley, N. J., a corporation of New Jersey No Drawing. Application August 16, 1944, Serial No. 549,797

4 Claims. (Cl. 260—397.6)

My invention relates to dissymmetric sulfones in which the sulfone group is linked to a para-aminophenyl radical and to a radical containing a keto group. Such sulfones can be illustrated by the general formula

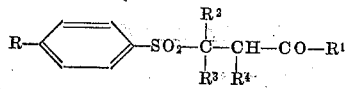

wherein R stands for an amino radical or a nitrogen-containing radical convertible into an amino radical, such as nitro or acylamino radicals, $COR^1$ is an acyl radical, in which $R^1$ may stand for a hydrocarbon radical such as one selected from the group consisting of alkyl, cycloalkyl, alkenyl, aryl, aralkyl, and aralkenyl radicals, and $R^2$, $R^3$, and $R^4$ each may stand for hydrogen or a hydrocarbon radical such as a radical selected from the group consisting of alkyl cycloalkyl, alkenyl, aryl, aralkyl, and aralkenyl, specific examples of the radicals being methyl, ethyl, higher alkyl, cyclopentyl, cyclohexyl, cyclohexenyl, propenyl, butenyl, phenyl, p-tolyl, p-chlorophenyl, naphthyl, benzyl, phenylethyl, and phenylethenyl.

Dissymmetric sulfones of this type have not yet been described. Furthermore, compounds of this general type have never been investigated as to their possible therapeutic usefulness. It was therefore surprising to find that these keto-sulfones represent a new type of useful intestinal antiseptics, being in this respect superior to the known compounds of the sulfanilamide series. They are practically atoxic, and they are not resorbed from the intestinal tract. When doses as high as 5 grams per kilogram of the new sulfones with a free amino group in the phenyl radical are fed to mice, not a trace of diazotable substances can be found in the blood of the animals.

Thus, for example, p-aminophenyl-(1-phenyl-2-benzoyl-ethyl)-sulfone, one of the compounds described in the attached examples, was tolerated by mice without any toxic symptoms in amounts exceeding 15 grams per kilogram when administered orally. No lethal or toxic dose could be reached. When normal mice were kept on a diet containing 1% of this new compound, a very substantial decrease in the count of coliforme organisms was found in at least 80% of the fecal specimens of the treated animals.

These new compounds can be prepared by reacting p-amino-benzene-sulfinic acid, or a similar benzene-sulfinic acid derivative substituted in para-position by a nitrogen-containing radical convertible into an amino radical, for example, p-nitro-benzene-sulfinic acid or p-acetamino-benzene-sulfinic acid, with an unsaturated ketone, containing at least one double bond in $\alpha,\beta$-position to the keto group. This method has been found to be of general applicability, and permits a very wide variation in the constitution of the new compounds, by using various $\alpha,\beta$-unsaturated ketones. The reaction can be performed by heating the components in aqueous alcohol, or a similar suitable solvent or diluent, whereby the new keto-sulfones are obtained in good yields. In accordance with the general rules governing addition reactions to the double bond of $\alpha,\beta$-unsaturated ketones, it is to be assumed that in this reaction the sulfur atom of the sulfinic acid is probably linked with the $\beta$-carbon atom of the $\alpha,\beta$-unsaturated ketone.

Thus, for example, by reacting p-amino-benzene-sulfinic acid with benzal-acetone, p-aminophenyl-(1-phenyl-2-acetyl-ethyl)-sulfone is obtained in 80% yield. The same compound can also be prepared by reacting p-nitro-benzene-sulfinic acid with benzal-acetone, and reducing the nitro-group in the p-nitro-phenyl-(1-phenyl-2-acetyl-ethyl)-sulfone thus formed, or by reacting p-acetamino-benzene-sulfinic acid with benzal-acetone to form p-acetamino-phenyl-(1-phenyl-2-acetyl-ethyl)-sulfone, and saponifying the acetamino-group in this intermediate. In a similar manner p-amino-phenyl-(1-phenyl-2-benzoyl-ethyl)-sulfone is obtained by reacting p-amino-benzene-sulfinic acid with benzal-acetophenone.

The following examples illustrate the invention:

EXAMPLE 1

*p-Amino-phenyl-(1,1-dimethyl-2-acetyl-ethyl)-sulfone*

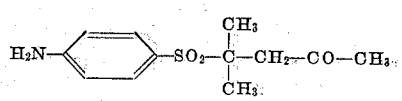

20 g. p-amino-benzene-sulfinic acid and 13 g. mesityl oxide are refluxed in 200 cc. 95% ethyl alcohol for 1½ hours. The alcoholic solution is then concentrated, until crystals begin to appear, and the solution cooled, to complete crystallization of the reaction product. It is then filtered off, and recrystallized from aqueous alcohol. Yield 24 g. M. P. 151° C. with decomposition.

Calc. for $C_{12}H_{17}O_3NS$: C 56.47  H 6.72  N 5.49%
Found:                       C 56.35  H 6.73  N 5.64%

EXAMPLE 2

*p-Amino-phenyl-(1-phenyl-2-acetyl-ethyl)-sulfone*

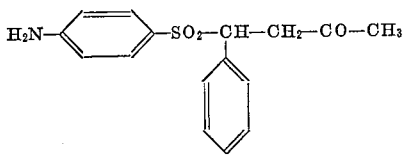

A mixture of 225 g. of p-amino-benzene-sulfinic acid and 265 g. of benzal-acetone in 3 liters of 80% ethyl alcohol is refluxed for 4 hours. The mixture, which contains large amounts of the insoluble reaction product, is filtered with suction while hot. The precipitate is washed on the filter with dilute and absolute ethyl alcohol, and thoroughly dried in vacuo. 315 g. of the sulfone are thus obtained, corresponding to a yield of 80.5% of the theory. The product melts at 179–181° C. with decomposition. Upon recrystallization from dioxane-water (1:1), with the addition of activated carbon, an absolutely white preparation is obtained, melting with decomposition at 179–181° C.

Calc. for $C_{16}H_{17}O_3NS$: C 63.34  H 5.65  N 4.62%
Found:                       C 63.36  H 5.42  N 4.63%

EXAMPLE 3

*p-Nitro-phenyl-(1-phenyl-2-acetyl-ethyl)-sulfone*

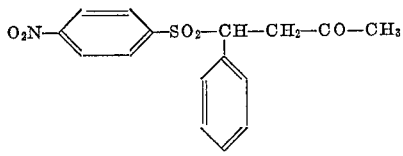

5 g. p-nitro-benzene-sulfinic acid and 5 g. benzal-acetone are mixed in 200 cc. 70% ethyl alcohol. On warming a clear yellow solution is obtained, which is refluxed for 90 minutes. On standing overnight at room temperature colorless crystals appear. They are filtered off, and twice recrystallized from 70% alcohol. Yield 9.0 g. M. P. 125–126° C.

Calc. for $C_{16}H_{15}O_5NS$: C 57.78  H 4.80%
Found:                       C 57.65  H 4.53%

EXAMPLE 4

*Catalytic reduction of p-nitro-phenyl-(1-phenyl-2-acetyl-ethyl)-sulfone*

0.5 g. of this nitro-sulfone described in Example 3 are catalytically reduced in 50 cc. absolute ethyl alcohol in the presence of 0.2 g. platinum oxide catalyst. At 25° C., and an initial hydrogen pressure of 30 pounds, a very rapid hydrogen absorption occurs. The reduced product precipitates as the reaction proceeds. When the theoretical amount of hydrogen is absorbed, 200 cc. acetone are added, to dissolve the precipitated amino-sulfone. The platinum is then filtered off, and the filtrate concentrated in vacuo to dryness. The colorless solid residue is recrystallized from a 1:1 dioxane-water mixture, washed with water and dried. 0.3 g. colorless needles are obtained, melting at 179–181° C. The reduction product is identical with the p-amino-phenyl-(1-phenyl-2-acetyl-ethyl)-sulfone described in Example 2. The two samples show no melting point depression when mixed.

EXAMPLE 5

*p-Acetamino-phenyl-(1-phenyl-2-acetyl-ethyl)-sulfone*

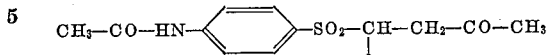

1 g. benzal-acetone and 1 g. p-acetamino-benzene-sulfinic acid are refluxed for 1 hour in 50 cc. ethyl alcohol. The solution is then concentrated to 5 cc., and water is added until it becomes turbid. On cooling colorless crystals are formed, which are purified by recrystallization from aqueous alcohol. Yield 1.2 g. M. P. 162–163° C., with decomposition.

Calc. for $C_{18}H_{19}O_4NS$: C 62.61  H 5.51  N 4.06%
Found:                       C 62.59  H 5.62  N 3.99%

On saponification with a 5% sodium carbonate solution in aqueous alcohol the N-acetyl-group is split off, and p-amino-phenyl-(1-phenyl-2-acetyl-ethyl)-sulfone is formed.

EXAMPLE 6

*p-Amino-phenyl-(1-phenyl-2-benzoyl-ethyl)-sulfone*

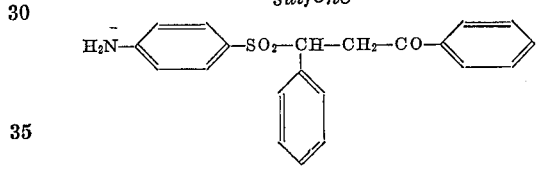

38 g. benzal-acetophenone and 25 g. p-amino-benzene-sulfinic acid are refluxed for 5 hours in 700 cc. of 85% ethyl alcohol. Fine crystals soon begin to appear and fill the reaction vessel. While still hot, the mixture is suction-filtered. The reaction product is washed first with 750 cc. warm absolute alcohol, then with 500 cc. water, and finally again with 300 cc. alcohol, and then dried in vacuo. Yield 32 g. M. P. 210–212° with decomposition.

The product is practically insoluble in most of the common organic solvents. It is slightly soluble in acetone and dioxane.

Calc. for $C_{21}H_{19}O_3NS$: C 69.04  H 5.21%
Found:                       C 69.08  H 4.94%

EXAMPLE 7

*p-Amino-phenyl-(1-phenyl-2-cinnamoyl-ethyl)-sulfone*

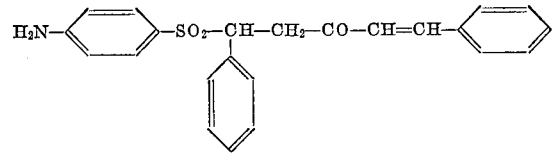

32 g. of dibenzal-acetone and 16 g. of p-amino-benzene-sulfinic acid are refluxed in 300 cc. 80% ethyl alcohol for 5 hours. The voluminous reaction product is filtered with suction, and is washed with 80% and with absolute alcohol. It is then suspended in acetone with stirring, and allowed to settle. The acetone is then decanted. This is repeated several times, and the precipitate then dried in vacuo. The pale yellow product thus obtained is completely insoluble in all the common organic solvents. Yield 38 g. M. P. 210–212° C., with decomposition.

The acetone-washed product is pure, and gives good analytical results.

Calc. for $C_{23}H_{21}O_3NS$: C 70.59  H 5.37%
Found: C 70.49  H 5.40%

What I claim is:

1. Sulfones corresponding to the general formula

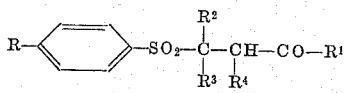

wherein R is amino, $COR^1$ is an acyl radical in which R' is a hydrocarbon radical, and $R^2$, $R^3$, and $R^4$ each stands for a member of the group consisting of hydrocarbon radicals and hydrogen.

2. p-Amino-phenyl-(1-phenyl-2-benzoyl-ethyl)-sulfone.

3. p-Amino-phenyl-(1-phenyl-2-acetyl-ethyl)-sulfone.

4. p-Amino-phenyl-(1-phenyl-2-cinnamoyl-ethyl)-sulfone.

MOSES WOLF GOLDBERG.

REFERENCES CITED

The following references are of record in the file of this patent:

UNITED STATES PATENTS

| Number | Name | Date |
|---|---|---|
| 2,010,828 | Rothrock | Aug. 13, 1935 |
| 2,207,021 | Martin et al. | July 9, 1940 |

FOREIGN PATENTS

| Number | Country | Date |
|---|---|---|
| 508,148 | Great Britain | June 27, 1939 |